(12) United States Patent
Kumar et al.

(10) Patent No.: US 9,529,400 B1
(45) Date of Patent: Dec. 27, 2016

(54) AUTOMATIC POWER DOMAIN AND VOLTAGE DOMAIN ASSIGNMENT TO SYSTEM-ON-CHIP AGENTS AND NETWORK-ON-CHIP ELEMENTS

(71) Applicant: NetSpeed Systems, San Jose, CA (US)

(72) Inventors: Sailesh Kumar, San Jose, CA (US);
Eric Norige, East Lansing, MI (US);
Pier Giorgio Raponi, San Jose, CA (US)

(73) Assignee: NetSpeed Systems, San Jose, CA (US)

( * ) Notice: Subject to any disclaimer, the term of this patent is extended or adjusted under 35 U.S.C. 154(b) by 171 days.

(21) Appl. No.: 14/527,463

(22) Filed: Oct. 29, 2014

(51) Int. Cl.
*G06F 1/26* (2006.01)
*G06F 1/32* (2006.01)

(52) U.S. Cl.
CPC .............. *G06F 1/26* (2013.01); *G06F 1/3253* (2013.01); *G06F 1/3278* (2013.01); *G06F 1/3287* (2013.01)

(58) Field of Classification Search
CPC .......... G06F 1/26; G06F 1/3237; G06F 1/324; G06F 1/3253; G06F 1/3278; G06F 1/3287; G06F 1/3296
See application file for complete search history.

(56) References Cited

U.S. PATENT DOCUMENTS

| 4,933,933 A | 6/1990 | Dally et al. |
| 5,355,455 A | 10/1994 | Hilgendorf et al. |
| 5,432,785 A | 7/1995 | Ahmed et al. |
| 5,764,740 A | 6/1998 | Holender |
| 5,991,308 A | 11/1999 | Fuhrmann et al. |
| 6,003,029 A | 12/1999 | Agrawal et al. |
| 6,101,181 A | 8/2000 | Passint et al. |
| 6,108,739 A | 8/2000 | James et al. |
| 6,249,902 B1 | 6/2001 | Igusa et al. |
| 6,314,487 B1 | 11/2001 | Hahn et al. |
| 6,415,282 B1 | 7/2002 | Mukherjea et al. |

(Continued)

FOREIGN PATENT DOCUMENTS

| CN | 103684961 A | 3/2014 |
| WO | 2014059024 A1 | 4/2014 |

OTHER PUBLICATIONS

Abts, D., et al., Age-Based Packet Arbitration in Large-Radix k-ary n-cubes, Supercomputing 2007 (SC07), Nov. 10-16, 2007, 11 pgs.

(Continued)

*Primary Examiner* — Dennis M Butler
(74) *Attorney, Agent, or Firm* — Procopio, Cory, Hargreaves & Savitch LLP

(57) ABSTRACT

The present disclosure relates system and method for automatic assignment of power domain and voltage domain to one or more SoC and/or NoC elements based on one or a combination of NoC and/or SoC specification/design, traffic specification, connectivity between SoC hosts that the NoC element in context is a part of, power specification (power domain and voltage domain of each host) of the hosts/SoC, and power profile(s) applicable for the NoC element in context. In another example implementation, power domain and voltage domain can be assigned to each SoC and/or NoC element based on pre-defined constraints and with an objective of reducing/minimizing static power consumption, reducing/minimizing hardware area, or identifying a tradeoff between the two parameters.

14 Claims, 12 Drawing Sheets

(56) References Cited

U.S. PATENT DOCUMENTS

| | | | |
|---|---|---|---|
| 6,925,627 | B1 | 8/2005 | Longway et al. |
| 7,065,730 | B2 | 6/2006 | Alpert et al. |
| 7,318,214 | B1 | 1/2008 | Prasad et al. |
| 7,590,959 | B2 | 9/2009 | Tanaka |
| 7,724,735 | B2 | 5/2010 | Locatelli et al. |
| 7,725,859 | B1 | 5/2010 | Lenahan et al. |
| 7,808,968 | B1 | 10/2010 | Kalmanek, Jr. et al. |
| 7,917,885 | B2 | 3/2011 | Becker |
| 7,957,381 | B2 | 6/2011 | Clermidy et al. |
| 8,050,256 | B1 | 11/2011 | Bao et al. |
| 8,059,551 | B2 | 11/2011 | Milliken |
| 8,099,757 | B2 | 1/2012 | Riedle et al. |
| 8,136,071 | B2 | 3/2012 | Solomon |
| 8,203,938 | B2 | 6/2012 | Gibbings |
| 8,281,297 | B2 | 10/2012 | Dasu et al. |
| 8,312,402 | B1 | 11/2012 | Okhmatovski et al. |
| 8,412,795 | B2 | 4/2013 | Mangano et al. |
| 8,448,102 | B2 | 5/2013 | Kornachuk et al. |
| 8,490,110 | B2 | 7/2013 | Hoover et al. |
| 8,492,886 | B2 | 7/2013 | Or-Bach et al. |
| 8,541,819 | B1 | 9/2013 | Or-Bach et al. |
| 8,543,964 | B2 | 9/2013 | Ge et al. |
| 8,601,288 | B2 * | 12/2013 | Brinks ............... G06F 1/26 365/202 |
| 8,601,423 | B1 | 12/2013 | Philip et al. |
| 8,635,577 | B2 | 1/2014 | Kazda et al. |
| 8,667,439 | B1 | 3/2014 | Kumar et al. |
| 8,705,368 | B1 | 4/2014 | Abts et al. |
| 8,717,875 | B2 | 5/2014 | Bejerano et al. |
| 8,738,860 | B1 | 5/2014 | Griffin et al. |
| 2002/0071392 | A1 | 6/2002 | Grover et al. |
| 2002/0073380 | A1 | 6/2002 | Cooke et al. |
| 2002/0083159 | A1 | 6/2002 | Ward et al. |
| 2002/0095430 | A1 | 7/2002 | Egilsson et al. |
| 2004/0216072 | A1 | 10/2004 | Alpert et al. |
| 2005/0147081 | A1 | 7/2005 | Acharya et al. |
| 2005/0203988 | A1 | 9/2005 | Nollet et al. |
| 2006/0161875 | A1 | 7/2006 | Rhee |
| 2006/0209846 | A1 | 9/2006 | Clermidy et al. |
| 2006/0268909 | A1 | 11/2006 | Langevin et al. |
| 2007/0088537 | A1 | 4/2007 | Lertora et al. |
| 2007/0118320 | A1 | 5/2007 | Luo et al. |
| 2007/0244676 | A1 | 10/2007 | Shang et al. |
| 2007/0256044 | A1 | 11/2007 | Coryer et al. |
| 2007/0267680 | A1 | 11/2007 | Uchino et al. |
| 2008/0072182 | A1 | 3/2008 | He et al. |
| 2008/0120129 | A1 | 5/2008 | Seubert et al. |
| 2008/0184259 | A1 | 7/2008 | Lesartre et al. |
| 2008/0232387 | A1 | 9/2008 | Rijpkema et al. |
| 2009/0046727 | A1 | 2/2009 | Towles |
| 2009/0070726 | A1 | 3/2009 | Mehrotra et al. |
| 2009/0268677 | A1 | 10/2009 | Chou et al. |
| 2009/0313592 | A1 | 12/2009 | Murali et al. |
| 2010/0040162 | A1 | 2/2010 | Suehiro |
| 2011/0022754 | A1 | 1/2011 | Cidon et al. |
| 2011/0035523 | A1 | 2/2011 | Feero et al. |
| 2011/0060831 | A1 | 3/2011 | Ishii et al. |
| 2011/0072407 | A1 | 3/2011 | Keinert et al. |
| 2011/0103799 | A1 | 5/2011 | Shacham et al. |
| 2011/0154282 | A1 | 6/2011 | Chang et al. |
| 2011/0276937 | A1 | 11/2011 | Waller |
| 2012/0022841 | A1 | 1/2012 | Appleyard |
| 2012/0023473 | A1 | 1/2012 | Brown et al. |
| 2012/0026917 | A1 | 2/2012 | Guo et al. |
| 2012/0054511 | A1 * | 3/2012 | Brinks ............... G06F 1/26 713/310 |
| 2012/0099475 | A1 | 4/2012 | Tokuoka |
| 2012/0110541 | A1 | 5/2012 | Ge et al. |
| 2012/0155250 | A1 | 6/2012 | Carney et al. |
| 2013/0028090 | A1 | 1/2013 | Yamaguchi et al. |
| 2013/0051397 | A1 | 2/2013 | Guo et al. |
| 2013/0073878 | A1 * | 3/2013 | Jayasimha ......... G06F 1/3287 713/300 |
| 2013/0080073 | A1 | 3/2013 | de Corral |
| 2013/0103369 | A1 | 4/2013 | Huynh et al. |
| 2013/0148506 | A1 | 6/2013 | Lea |
| 2013/0151215 | A1 | 6/2013 | Mustapha |
| 2013/0159944 | A1 | 6/2013 | Uno et al. |
| 2013/0174113 | A1 | 7/2013 | Lecler et al. |
| 2013/0207801 | A1 | 8/2013 | Barnes |
| 2013/0219148 | A1 | 8/2013 | Chen et al. |
| 2013/0263068 | A1 | 10/2013 | Cho et al. |
| 2013/0326458 | A1 | 12/2013 | Kazda et al. |
| 2014/0068132 | A1 | 3/2014 | Philip et al. |
| 2014/0092740 | A1 | 4/2014 | Wang et al. |
| 2014/0098683 | A1 | 4/2014 | Kumar et al. |
| 2014/0115218 | A1 | 4/2014 | Philip et al. |
| 2014/0115298 | A1 | 4/2014 | Philip et al. |
| 2014/0143557 | A1 * | 5/2014 | Kuesel ............... G06F 1/26 713/300 |
| 2015/0026494 | A1 * | 1/2015 | Bainbridge ......... G06F 1/324 713/322 |
| 2015/0381707 | A1 * | 12/2015 | How ................. H04L 67/10 709/208 |

OTHER PUBLICATIONS

Das, R., et al., Aergia: Exploiting Packet Latency Slack in On-Chip Networks, 37th International Symposium on Computer Architecture (ISCA '10), Jun. 19-23, 2010, 11 pgs.

Ebrahimi, E., et al., Fairness via Source Throttling: A Configurable and High-Performance Fairness Substrate for Multi-Core Memory Systems, ASPLOS '10, Mar. 13-17, 2010, 12 pgs.

Grot, B., Preemptive Virtual Clock: A Flexible, Efficient, and Cost-Effective QOS Scheme for Networks-on-Chip, Micro '09, Dec. 12-16, 2009, 12 pgs.

Grot, B., Kilo-NOC: A Heterogeneous Network-on-Chip Architecture for Scalability and Service Guarantees, ISCA '11, Jun. 4-8, 2011, 12 pgs.

Grot, B., Topology-Aware Quality-of-Service Support in Highly Integrated Chip Multiprocessors, 6th Annual Workshop on the Interaction between Operating Systems and Computer Architecture, Jun. 2006, 11 pgs.

Jiang, N., et al., Performance Implications of Age-Based Allocations in On-Chip Networks, CVA MEMO 129, May 24, 2011, 21 pgs.

Lee, J. W., et al., Globally-Synchronized Frames for Guaranteed Quality-of-Service in On-Chip Networks, 35th IEEE/ACM International Symposium on Computer Architecture (ISCA), Jun. 2008, 12 pgs.

Lee, M. M., et al., Approximating Age-Based Arbitration in On-Chip Networks, PACT '10, Sep. 11-15, 2010, 2 pgs.

Li, B. et al CoQoS: Coordinating QoS-Aware Shared Resources in NoC-based SoCs, J. Parallel Distrib. Comput., 71(5), May 2011, 14 pgs.

International Search Report and Written Opinion for PCT/US2013/064140, Jan. 22, 2014, 9 pgs.

International Search Report and Written Opinion for PCT/US2014/012003, Mar. 26, 2014, 9 pgs.

International Search Report and Written Opinion for PCT/US2014/012012, May 14, 2014, 9 pgs.

Ababei, C., et al., Achieving Network on Chip Fault Tolerance by Adaptive Remapping, Parallel & Distributed Processing, 2009, IEEE International Symposium, 4 pgs.

Beretta, I, et al., A Mapping Flow for Dynamically Reconfigurable Multi-Core System-on-Chip Design, IEEE Transactions on Computer-Aided Design of Integrated Circuits and Systems, Aug. 2011, 30(8), pp. 1211-1224.

Gindin, R., et al., NoC-Based FPGA: Architecture and Routing, Proceedings of the First International Symposium on Networks-on-Chip (NOCS'07), May 2007, pp. 253-262.

Yang, J., et al., Homogeneous NoC-based FPGA: The Foundation for Virtual FPGA, 10th IEEE International Conference on Computer and Information Technology (CIT 2010), Jun. 2010, pp. 62-67.

International Search Report and Written Opinion for PCT/US2014/023625, Jul. 10, 2014, 9 pgs.

(56) References Cited

OTHER PUBLICATIONS

International Search Report and Written Opinion for PCT/US2014/037902, Sep. 30, 2014, 14 pgs.

\* cited by examiner

Power Domain Assignment Table

| PP1 (Power Profile 1) | | | PP2 (Power Profile 2) | | |
|---|---|---|---|---|---|
| PD1 | PD2 | PD3 | PD3 | PD4 | PD5 |
| H1 | H4 | R1 | R1 | H2 | H3 |
| R2 | R4 | | | | |
| B1 | PR1 | | | | |

FIG. 5

AUTOMATIC POWER DOMAIN AND VOLTAGE DOMAIN ASSIGNMENT TO SYSTEM-ON-CHIP AGENTS AND NETWORK-ON-CHIP ELEMENTS

BACKGROUND

Technical Field

Methods and example implementations described herein are directed to an interconnect architecture, and more specifically, to implementation of automatic power and voltage domain assignment to System on Chip (SoC) and/or Network on Chip (NoC) elements.

Related Art

The number of components on a chip is rapidly growing due to increasing levels of integration, system complexity and shrinking transistor geometry. Complex System-on-Chips (SoCs) may involve a variety of components e.g., processor cores, DSPs, hardware accelerators, memory and I/O, while Chip Multi-Processors (CMPs) may involve a large number of homogenous processor cores, memory and I/O subsystems. In both SoC and CMP systems, the on-chip interconnect plays a role in providing high-performance communication between the various components. Due to scalability limitations of traditional buses and crossbar based interconnects, Network-on-Chip (NoC) has emerged as a paradigm to interconnect a large number of components on the chip. NoC is a global shared communication infrastructure made up of several routing nodes interconnected with each other using point-to-point physical links.

Messages are injected by the source and are routed from the source node to the destination over multiple intermediate nodes and physical links. The destination node then ejects the message and provides the message to the destination. For the remainder of this application, the terms 'components', 'blocks', 'hosts' or 'cores' will be used interchangeably to refer to the various system components, which are interconnected using a NoC. Terms 'routers' and 'nodes' will also be used interchangeably. Without loss of generalization, the system with multiple interconnected components will itself be referred to as a 'multi-core system'.

There are several topologies in which the routers can connect to one another to create the system network. Bi-directional rings (as shown in FIG. 1(a)), 2-D (two dimensional) mesh (as shown in FIG. 1(b)) and 2-D Torus (as shown in FIG. 1(c)) are examples of topologies in the related art. Mesh and Torus can also be extended to 2.5-D (two and half dimensional) or 3-D (three dimensional) organizations. FIG. 1(d) shows a 3D mesh NoC, where there are three layers of 3x3 2D mesh NoC shown over each other. The NoC routers have up to two additional ports, one connecting to a router in the higher layer, and another connecting to a router in the lower layer. Router 111 in the middle layer of the example has both ports used, one connecting to the router at the top layer and another connecting to the router at the bottom layer. Routers 110 and 112 are at the bottom and top mesh layers respectively, therefore they have only the upper facing port 113 and the lower facing port 114 respectively connected.

Packets are message transport units for intercommunication between various components. Routing involves identifying a path composed of a set of routers and physical links of the network over which packets are sent from a source to a destination. Components are connected to one or multiple ports of one or multiple routers; with each such port having a unique ID. Packets carry the destination's router and port ID for use by the intermediate routers to route the packet to the destination component.

Examples of routing techniques include deterministic routing, which involves choosing the same path from A to B for every packet. This form of routing is independent from the state of the network and does not load balance across path diversities, which might exist in the underlying network. However, such deterministic routing may implemented in hardware, maintains packet ordering and may be rendered free of network level deadlocks. Shortest path routing may minimize the latency as such routing reduces the number of hops from the source to the destination. For this reason, the shortest path may also be the lowest power path for communication between the two components. Dimension-order routing is a form of deterministic shortest path routing in 2-D, 2.5-D, and 3-D mesh networks. In this routing scheme, messages are routed along each coordinates in a particular sequence until the message reaches the final destination. For example in a 3-D mesh network, one may first route along the X dimension until it reaches a router whose X-coordinate is equal to the X-coordinate of the destination router. Next, the message takes a turn and is routed in along Y dimension and finally takes another turn and moves along the Z dimension until the message reaches the final destination router. Dimension ordered routing may be minimal turn and shortest path routing.

FIG. 2(a) pictorially illustrates an example of XY routing in a two dimensional mesh. More specifically, FIG. 2(a) illustrates XY routing from node '34' to node '00'. In the example of FIG. 2(a), each component is connected to only one port of one router. A packet is first routed over the x-axis till the packet reaches node '04' where the x-coordinate of the node is the same as the x-coordinate of the destination node. The packet is next routed over the y-axis until the packet reaches the destination node.

In heterogeneous mesh topology in which one or more routers or one or more links are absent, dimension order routing may not be feasible between certain source and destination nodes, and alternative paths may have to be taken. The alternative paths may not be shortest or minimum turn.

Source routing and routing using tables are other routing options used in NoC. Adaptive routing can dynamically change the path taken between two points on the network based on the state of the network. This form of routing may be complex to analyze and implement.

A NoC interconnect may contain multiple physical networks. Over each physical network, there may exist multiple virtual networks, wherein different message types are transmitted over different virtual networks. In this case, at each physical link or channel, there are multiple virtual channels; each virtual channel may have dedicated buffers at both end points. In any given clock cycle, only one virtual channel can transmit data on the physical channel.

NoC interconnects may employ wormhole routing, wherein, a large message or packet is broken into small pieces known as flits (also referred to as flow control digits). The first flit is the header flit, which holds information about this packet's route and key message level info along with payload data and sets up the routing behavior for all subsequent flits associated with the message. Optionally, one or more body flits follows the head flit, containing the remaining payload of data. The final flit is the tail flit, which in addition to containing the last payload also performs some bookkeeping to close the connection for the message. In wormhole flow control, virtual channels are often implemented.

The physical channels are time sliced into a number of independent logical channels called virtual channels (VCs). VCs provide multiple independent paths to route packets, however they are time-multiplexed on the physical channels. A virtual channel holds the state needed to coordinate the handling of the flits of a packet over a channel. At a minimum, this state identifies the output channel of the current node for the next hop of the route and the state of the virtual channel (idle, waiting for resources, or active). The virtual channel may also include pointers to the flits of the packet that are buffered on the current node and the number of flit buffers available on the next node.

The term "wormhole" plays on the way messages are transmitted over the channels: the output port at the next router can be so short that received data can be translated in the head flit before the full message arrives. This allows the router to quickly set up the route upon arrival of the head flit and then opt out from the rest of the conversation. Since a message is transmitted flit by flit, the message may occupy several flit buffers along its path at different routers, creating a worm-like image.

Based upon the traffic between various end points, and the routes and physical networks that are used for various messages, different physical channels of the NoC interconnect may experience different levels of load and congestion. The capacity of various physical channels of a NoC interconnect is determined by the width of the channel (number of physical wires) and the clock frequency at which it is operating. Various channels of the NoC may operate at different clock frequencies, and various channels may have different widths based on the bandwidth requirement at the channel. The bandwidth requirement at a channel is determined by the flows that traverse over the channel and their bandwidth values. Flows traversing over various NoC channels are affected by the routes taken by various flows. In a mesh or Torus NoC, there may exist multiple route paths of equal length or number of hops between any pair of source and destination nodes. For example, in FIG. 2(b), in addition to the standard XY route between nodes 34 and 00, there are additional routes available, such as YX route 203 or a multi-turn route 202 that makes more than one turn from source to destination.

In a NoC with statically allocated routes for various traffic slows, the load at various channels may be controlled by intelligently selecting the routes for various flows. When a large number of traffic flows and substantial path diversity is present, routes can be chosen such that the load on all NoC channels is balanced nearly uniformly, thus avoiding a single point of bottleneck. Once routed, the NoC channel widths can be determined based on the bandwidth demands of flows on the channels. Unfortunately, channel widths cannot be arbitrarily large due to physical hardware design restrictions, such as timing or wiring congestion. There may be a limit on the maximum channel width, thereby putting a limit on the maximum bandwidth of any single NoC channel.

Additionally, wider physical channels may not help in achieving higher bandwidth if messages are short. For example, if a packet is a single flit packet with a 64-bit width, then no matter how wide a channel is, the channel will only be able to carry 64 bits per cycle of data if all packets over the channel are similar. Thus, a channel width is also limited by the message size in the NoC. Due to these limitations on the maximum NoC channel width, a channel may not have enough bandwidth in spite of balancing the routes.

To address the above bandwidth concern, multiple parallel physical NoCs may be used. Each NoC may be called a layer, thus creating a multi-layer NoC architecture. Hosts inject a message on a NoC layer; the message is then routed to the destination on the NoC layer, where it is delivered from the NoC layer to the host. Thus, each layer operates more or less independently from each other, and interactions between layers may only occur during the injection and ejection times. FIG. 3(a) illustrates a two layer NoC. Here the two NoC layers are shown adjacent to each other on the left and right, with the hosts connected to the NoC replicated in both left and right diagrams. A host is connected to two routers in this example—a router in the first layer shown as R1, and a router is the second layer shown as R2. In this example, the multi-layer NoC is different from the 3D NoC, i.e. multiple layers are on a single silicon die and are used to meet the high bandwidth demands of the communication between hosts on the same silicon die. Messages do not go from one layer to another. For purposes of clarity, the present application will utilize such a horizontal left and right illustration for multi-layer NoC to differentiate from the 3D NoCs, which are illustrated by drawing the NoCs vertically over each other.

In FIG. 3(b), a host connected to a router from each layer, R1 and R2 respectively, is illustrated. Each router is connected to other routers in its layer using directional ports 301, and is connected to the host using injection and ejection ports 302. A bridge-logic 303 may sit between the host and the two NoC layers to determine the NoC layer for an outgoing message and sends the message from host to the NoC layer, and also perform the arbitration and multiplexing between incoming messages from the two NoC layers and delivers them to the host.

In a multi-layer NoC, the number of layers needed may depend upon a number of factors such as the aggregate bandwidth requirement of all traffic flows in the system, the routes that are used by various flows, message size distribution, maximum channel width, etc. Once the number of NoC layers in NoC interconnect is determined in a design, different messages and traffic flows may be routed over different NoC layers. Additionally, one may design NoC interconnects such that different layers have different topologies in number of routers, channels and connectivity. The channels in different layers may have different widths based on the flows that traverse over the channel and their bandwidth requirements.

In a NoC interconnect, if the traffic profile is not uniform and there is a certain amount of heterogeneity (e.g., certain hosts talking to each other more frequently than the others), the interconnect performance may depend on the NoC topology and where various hosts are placed in the topology with respect to each other and to what routers they are connected to. For example, if two hosts talk to each other frequently and require higher bandwidth than other interconnects, then they should be placed next to each other. This will reduce the latency for this communication which thereby reduces the global average latency, as well as reduce the number of router nodes and links over which the higher bandwidth of this communication must be provisioned.

Moving two hosts closer together may make certain other hosts far apart since all hosts must fit into the 2D planar NoC topology without overlapping with each other. Thus, various tradeoffs may need to be made and the hosts must be placed after examining the pair-wise bandwidth and latency requirements between all hosts so that certain global cost and performance metrics is optimized. The cost and performance metrics can be, for example, average structural latency between all communicating hosts in number of router hops, or sum of bandwidth between all pair of hosts and the distance between them in number of hops, or some combination of these two. This optimization problem is known to be Non-deterministic Polynomial-time hard (NP-hard) and heuristic based approaches are often used. The hosts in a system may vary in shape and sizes with respect to each other, which puts additional complexity in placing them in a 2D planar NoC topology, packing them optimally while leaving little whitespaces, and avoiding overlapping hosts.

There are several protocols by which components can connect to a network. Several industry standards such as Advanced eXtensible Interface (AXI), Peripheral Component Interconnect (PCI), etc are typically used for such inter-component interaction. In addition, several internal protocols have been developed for communication between components. In a complex system-on-chip, there may be over a hundred components, all of which may be connected to the same network by which they communicate with memory. These components have evolved through different periods of time and through different architectural and performance preferences, due to which they chose to adopt different interface protocols. Components that expect to connect to each other over a NoC are therefore now required to convert their communication into a language that is understood by each intended destination.

Furthermore, existing NoC elements are manually assigned their respective power and voltage domains, making it inefficient to execute such practice for a large NoC specification and also creating inefficiencies in the overall SOC-NOC architecture.

There is therefore a need for an improved mechanism for automatically and intelligently assigning power domains and voltage domains to various NOC elements such as routers, bridges, and pipeline stages, such that static power consumption is minimal and/or hardware area is minimal and/or an optimal tradeoff between the two is achieved.

SUMMARY

The present disclosure relates system and method for automatic assignment of power domain (PD) and voltage domain (VD) to one or more SoC agents and/or NoC elements based on one or a combination of NoC specification/design, traffic specification, connectivity between hosts that the NoC element in context is a part of, power specification (power domain and voltage domain of each host) of the hosts/SoC, constraints defined for power assignment, and power state(s) or profile(s) applicable for the NoC element in context. In another example implementation, power domain and voltage domain can be assigned to each NoC element with an objective of reducing/minimizing static power consumption and/or reducing/minimizing hardware area and/or identifying a tradeoff between the two parameters.

In an aspect, method of the present disclosure relates to assignment of power domain (PD) and voltage domain (VD) to one or more NoC elements, wherein the method includes the steps of identifying SoC agent and/or NoC elements such as routers, pipelines, bridges, among others that are required to be active in each power profile (PP). Once all NoC elements/SoC agents required to be active in a given power profile have been identified, based on pre-defined constraints on assignment of power domain and voltage domain, one or more possible assignment choices of PDs/VDs for each SoC agent/NoC element can be identified, from which such PDs/VDs that violate the power profile practice identified above can be eliminated. The method can further include assigning, from amongst the final allowed PD/VD choices of assignment, a random PD/VD to each NoC element and computing a cost function F based on hardware cost/area and power cost associated with the assignment. Once the desired set of NoC elements have been assigned a power domain and a voltage domain, power profile that includes the assigned PD can be configured to include the PD of NoC elements such that only the new PD of the NoC elements that have been assigned PD are included in/added to the appropriate PP. Upon updation of power profile, simulated annealing can be performed on revised NoC element assignments of PD/VD in order to recompute costs and change assignments based on the recomputed costs.

One should appreciate that even though most of the present disclosure has been explained with reference to and examples of NoC elements, the proposed mechanisms and/or techniques of power assignment (PD and VD assignment) are equally applicable to SoC agents as well, and therefore SoC agents/hosts are also completely within the scope of the instant disclosure.

In another aspect, system of the present disclosure can include a power-profile based NoC element identification module, a NoC-specific power domain and voltage domain choice identification module, a random power domain and voltage domain assignment module, a cost function computation module, an assignment-based power profile updation module, and a power domain and voltage domain optimization module, wherein the power-profile based NoC element identification module can be configured to compute NoC elements such as routers, pipelines, bridges, among others that are required to be active in each power profile (PP). NoC-specific power domain and voltage domain choice identification module can be configured to, once all NoC elements required to be active in a given power profile have been identified, based on pre-defined constraints on assignment of power domain and voltage domain, identify one or more possible assignment choices of PDs/VDs for each NoC element, from which such PDs/VDs that violate the power profile practice PP1 identified above can be eliminated. Random power domain and voltage domain assignment module can be configured to, from amongst the final allowed PD/VD choices of assignment, assign a random PD/VD to each NoC element. Cost function computation module can be configured to compute a cost function F based on hardware cost/area and power cost. Assignment-based power profile updation module can be configured to, once desired set of NoC elements have been assigned a power domain and a voltage domain, update the power profile that includes the assigned PD so as to include the NoC elements such that only the new NoC elements that have been assigned PD are included in/added to the appropriate PP. Power domain and voltage domain optimization module can be configured to, upon updation of power profile, perform simulated annealing on revised NoC element assignments of PD/VD in order to recompute costs and change assignments based on the recomputed costs.

BRIEF DESCRIPTION OF THE DRAWINGS

FIG. 5 illustrates an exemplary logical table showing assignment of power domains to one or more NoC elements in accordance with an example implementation of the present disclosure.

DETAILED DESCRIPTION

Figure 1A:
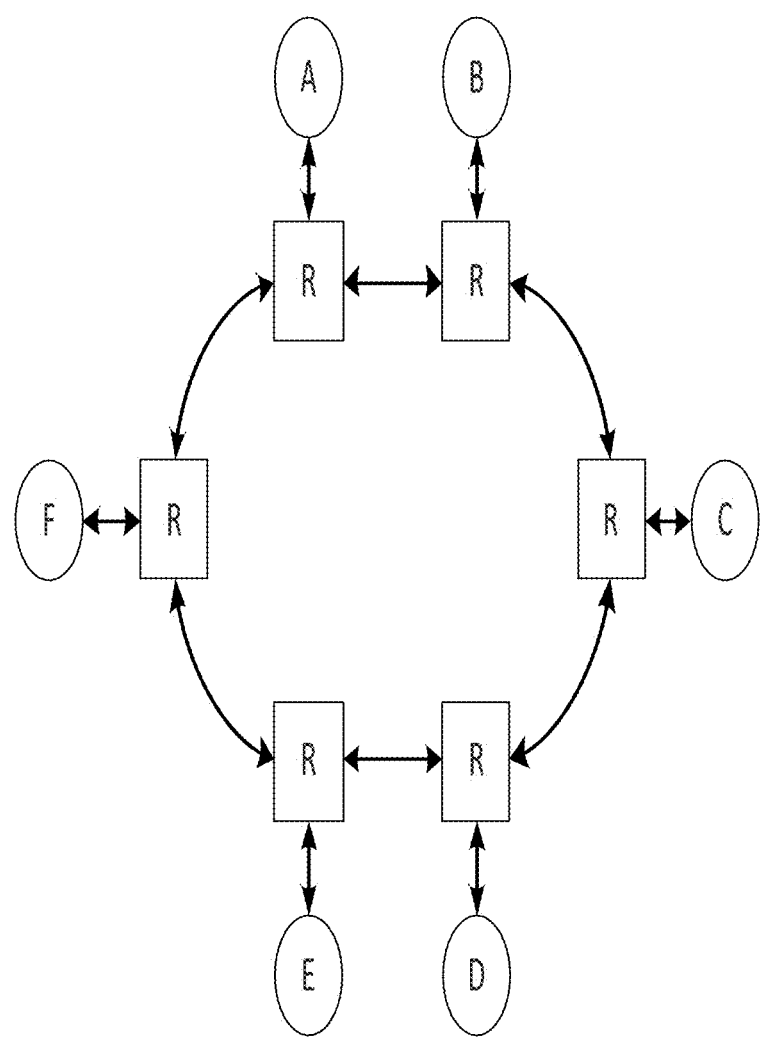
FIGS. 1(a), 1(b) 1(c) and 1(d) illustrate examples of Bidirectional ring, 2D Mesh, 2D Torus, and 3D Mesh NoC Topologies.
Figure 1B:
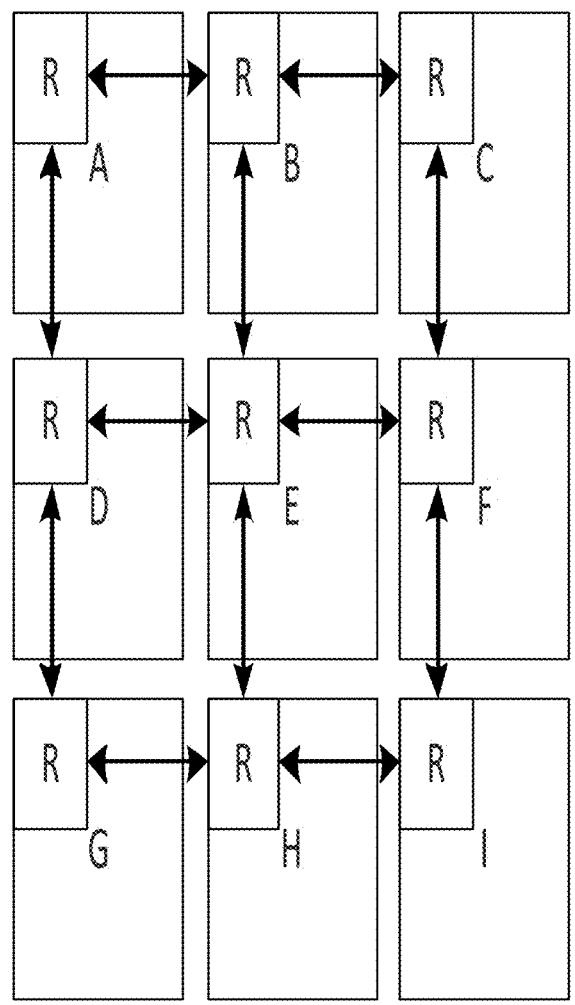
Figure 1C:
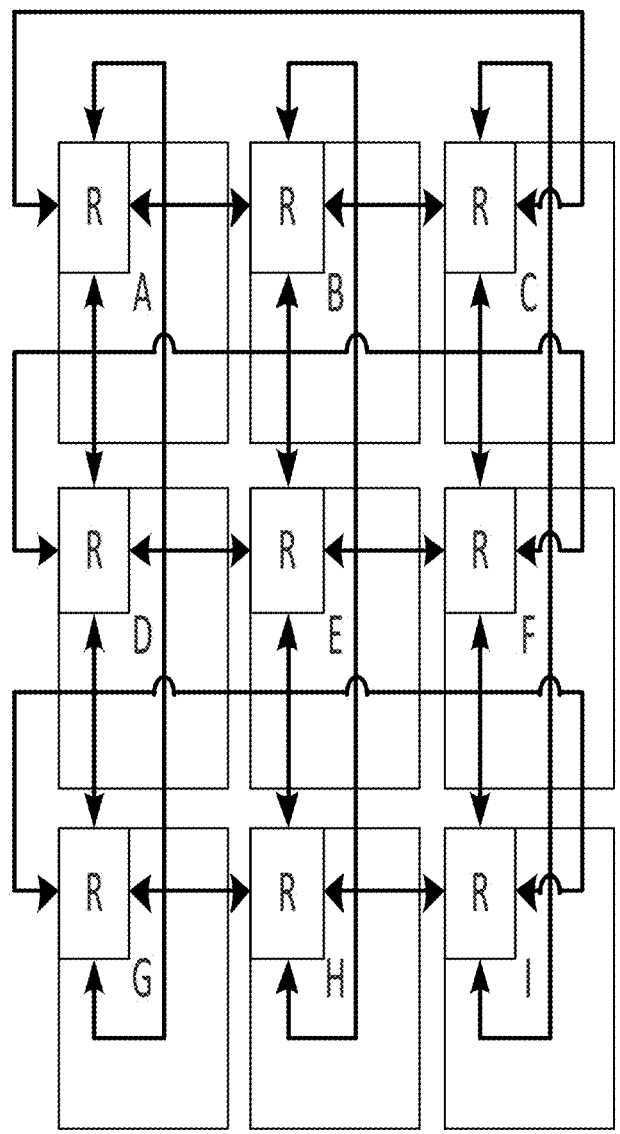
Figure 1D:
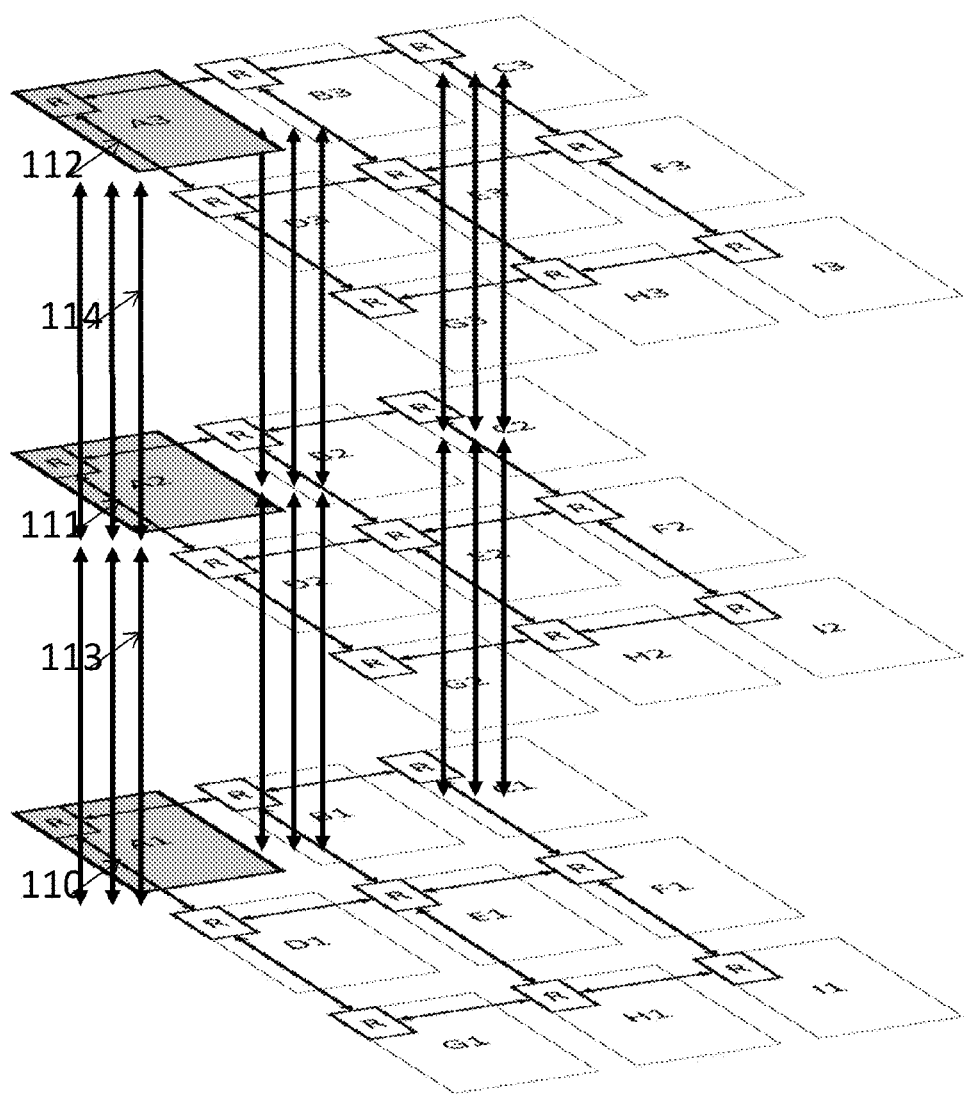
Figure 2A:
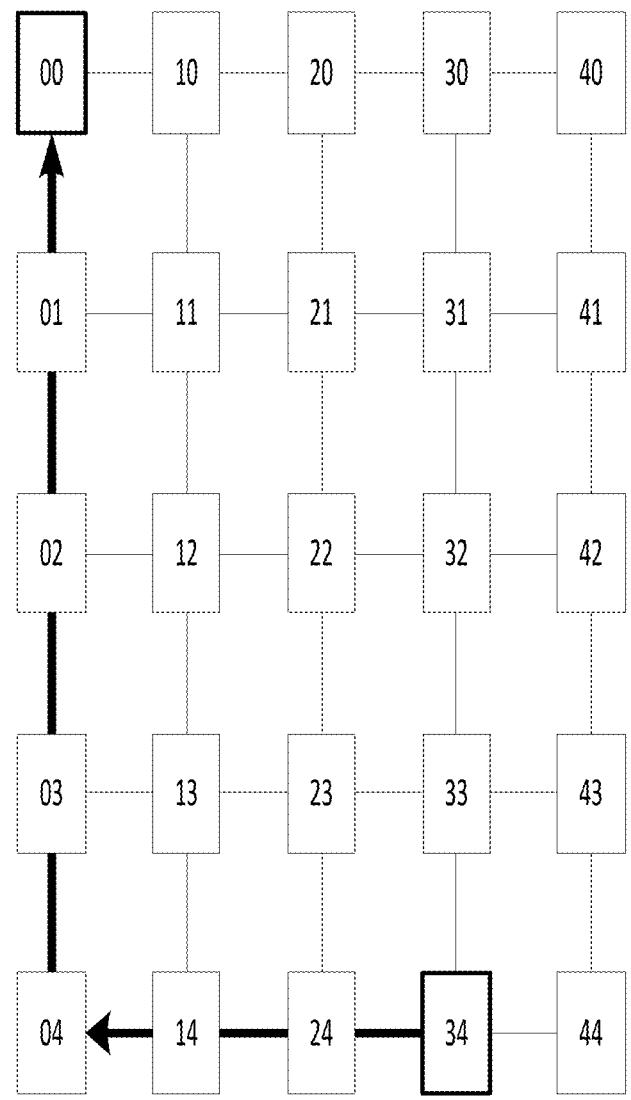
FIG. 2(a) illustrates an example of XY routing in a related art two dimensional mesh.
Figure 2B:
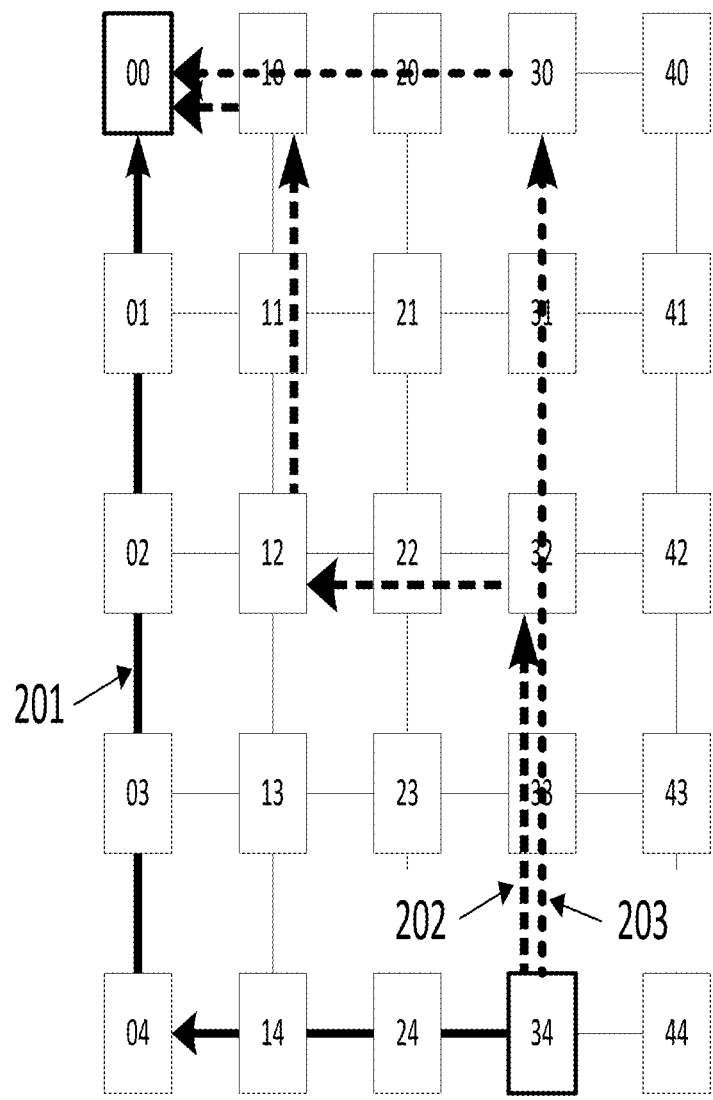
FIG. 2(b) illustrates three different routes between a source and destination nodes.
Figure 3A:
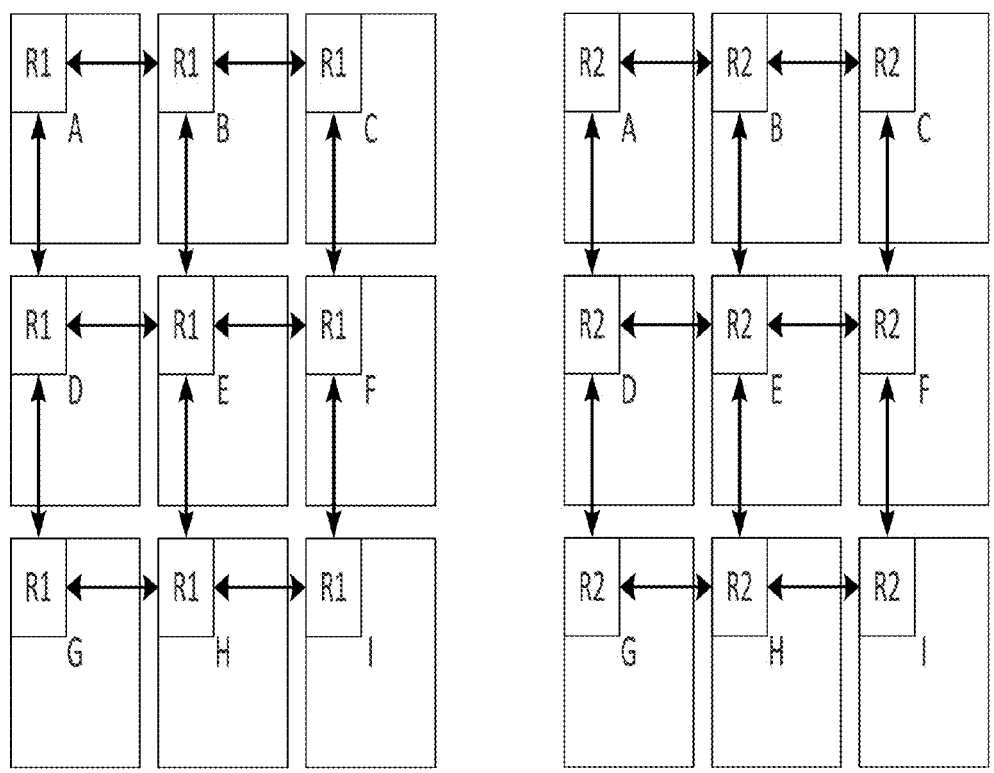
FIG. 3(a) illustrates an example of a related art two layer NoC interconnect.
Figure 3B:
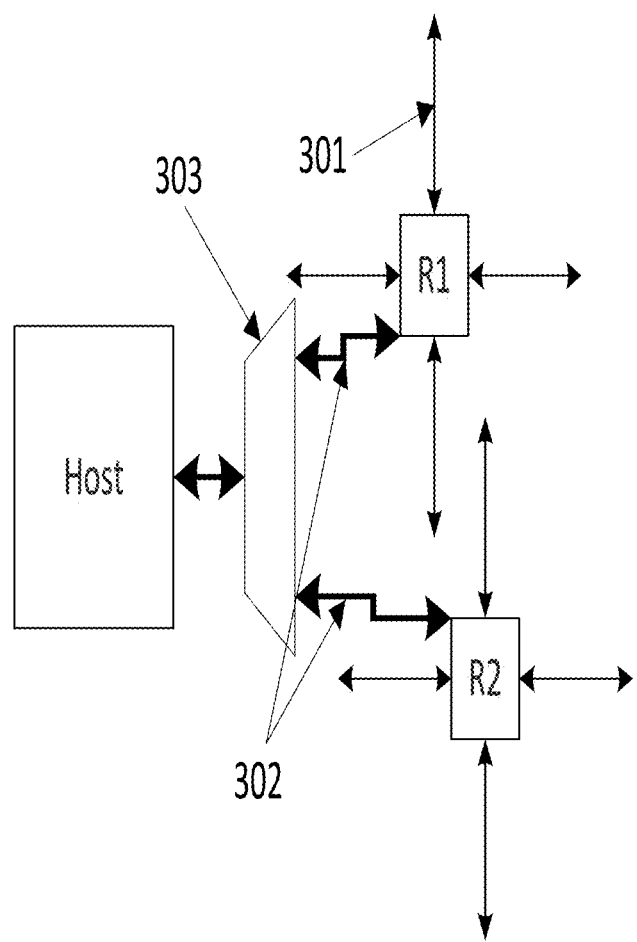
FIG. 3(b) illustrates the related art bridge logic between host and multiple NoC layers.

The following detailed description provides further details of the figures and example implementations of the present application. Reference numerals and descriptions of redundant elements between figures are omitted for clarity. Terms used throughout the description are provided as examples and are not intended to be limiting. For example, use of the term "automatic" may involve fully automatic or semi-automatic implementations involving user or administrator control over certain aspects of the implementation, depending on the desired implementation of one of ordinary skill in the art practicing implementations of the present application.

A distributed NoC interconnect connects various components of a system on chip (SoC) with each other using multiple routers and point to point links between the routers. Traffic profile of a SoC includes transactions between various components in the SoC and their properties (e.g., Quality of Service (QoS), priority, bandwidth and latency requirements, transaction sizes, etc.). Traffic profile information may be used to determine how various transactions will be routed in the NoC topology, and accordingly make provisions for the link capacities, virtual channels, and router nodes of the NoC. Accurate knowledge of the traffic profile can lead to a more optimized NoC hardware with minimal overprovisioning in terms of link wires, virtual channel buffers, and additional router nodes. A variety of SoCs today are designed to run a number of different applications, and the resulting NoC traffic profile therefore may differ based on how and in what market segments the SoC is deployed, and what applications are supported. Supporting a variety of traffic profiles offers several challenges in the NoC design and optimization. Even if multiple traffic profiles are supported functionally, the traffic profile observed in a particular setting may be different from the set of profiles for which the NoC is optimized, leading to sub-optimal power consumption and NoC performance.

Like hosts/SoC elements, NoC elements such as routers, bridges, and pipeline stages, are typically associated with a power domain (PD) and a voltage domain (VD). The voltage domain is where voltage supply to a collection of transistors of a hardware NoC element can be varied independent of other voltage supplies. For example, SRAMs or flip-flops may have transistors tied to different voltage domains. In such configurations, a level shifter may be utilized to cross the voltage domain boundary.

Each hardware element can also be associated with a power domain indicating an area to which the voltage supply can be interrupted by a power switch. Power switches can be on-chip with 'always on' cells and state retention allowed, and can also be off-chip with no 'always on' cells. A voltage domain may contain several power domains. Hardware elements may also be associated with a power profile, which indicates a use case describing a collection of power domains and always on domains in ON, OFF states.

Each SoC agent and/or NoC element can therefore be associated with a defined power domain and voltage domain that is pre-configured in its specification, wherein, in an aspect of the present disclosure, a plurality of NoC elements that are operatively connected with hosts in a network interconnect can be automatically assigned their respective power and voltage domains based on NoC specification/design, connectivity with hosts, traffic characteristics, and power and voltage domains of hosts that the NoC elements connect.

As also mentioned above, a power profile (PP) includes and is a collection of one or more power domains (PDs). For instance, in case a first host, say CPU has a power domain of PD1, and a second host, say memory has a power domain of PD2, power profile can include both the power domains PD1 and PD2 as, for instance, a set of power domains {PD1, PD2}. In another aspect, each power profile (also referred to as "PP" hereinafter) can be associated with a weight based on the power domains that it represents, load/traffic characteristics on the hosts/NoC elements that have the power domains that it represents, among other like parameters. In another aspect, as each power profile has a defined number of power domains, each power profile is disjunctive from other power profiles.

According to one example implementation, each NoC element can be automatically assigned a power domain and a voltage domain based one or a combination of NoC specification/design, traffic specification, connectivity between hosts that the NoC element in context is a part of, power specification (power domain and voltage domain of each host) of the hosts/SoC, and power profile(s) applicable for the NoC element in context. In another example implementation, power domain and voltage domain can be assigned to each NoC element with an objective of reducing/minimizing static power consumption, reducing/minimizing hardware area, or identifying a tradeoff between the two parameters. In an aspect, hardware area can be reduced by reducing the number of isolation cells required during power domain crossing and/or based on the number of level shifters required during voltage domain crossing. Example implementations of generating or implementing such specifications are described, for example, in U.S. application Ser. No. 14/495,689, herein incorporated by reference in its entirety for all purposes.

In an aspect of the present disclosure, power domain (PD) and voltage domain (VD) can be assigned to each NoC based on a plurality of constraints. In an instance, a constraint can be that PD and VD is assigned to each NoC element such that no new PD and VD is needed and the assigned PD/VD is from an existing set of PDs/VDs that are already assigned to hosts or to earlier NoCs or are available in general. In another instance, a constraint can be that PD and VD is assigned to each NoC element such that only a defined number of new power domains "n", and new voltage domains "m" can be assigned. Similarly, another constraint can be that PD and VD is assigned to each NoC element such that a PD that is not always "ON" is selected. In yet another example, a constraint can be that PD and VD is assigned to each NoC element such that only PDs/VDs of neighboring/adjacent NoC/hardware elements can be used. One should appreciate that any other constraint can always be imposed while selecting a power domain and a voltage domain for a given NoC element, and all such constraints are completely within the scope of the present disclosure.

Aspects of the present disclosure further relate to assignment of a power profile to each NoC element based on assignment of a power domain to the NoC element. As mentioned above, each power profile can include one or more power domains, hosts/NoC elements of which are ON when the profile is activated. Therefore, power profile needs to be accurately assigned to each NoC element so as to achieve the above-mentioned objectives of reducing power and hardware area/cost.

In example implementations, power profile can indicate what collection of hosts would be turned ON or OFF when the power profile is activated. For instance, if only audio output is desired, power domain of display SoC element can be turned down (as no video would required), and therefore power profile of such a power domain needs to be deactivated, and at the same time, power domains for audio output/speaker/memory should be ON, and therefore power profile that they form part of should be different from the power profile that has the power domain for the display SoC element. Based on traffic characteristics as well as number of hosts/NoC elements that are assigned to a given power domain (and therefore to a given power profile), a weight can also be associated to each power profile.

Figure 4:
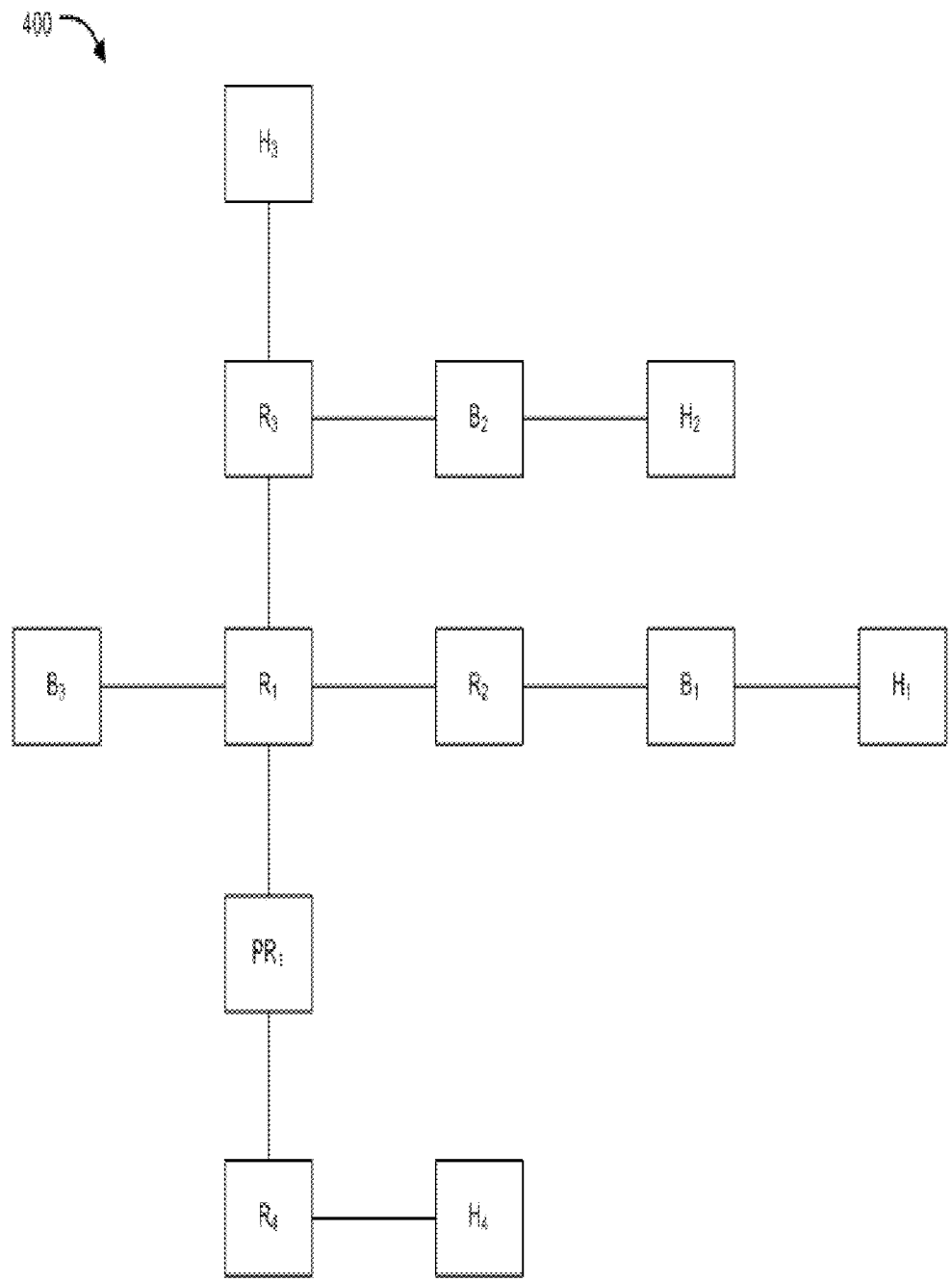
FIG. 4 illustrates an exemplary interconnect architecture showing assignment of power domain and voltage domain to one or more NoC elements in accordance with an example implementation of the present disclosure.

FIG. 4 illustrates an exemplary NoC architecture 400 showing a plurality of NoC elements (shown as bridges B, pipeline registers PR, and routers R) and hosts (shown as hosts H) in accordance with an example implementation of the present disclosure. As mentioned above, each host H can have a pre-defined power domain (PD) and voltage domain (VD), and the present disclosure aims at automating the assignment of power domains and voltage domains to one or more NoC elements such that the assignment meets the constraints defined for assignment as well as optimizing the assignment to reduce static power consumption and/or hardware areas or a combination thereof.

As would be noticed, NoC elements including bridge B1, routers R1, R2, and R4, and pipeline register (PR) PR1 form part of communication between hosts H1 and H4, whereas bridge B2 and router R3 form part of communication between hosts H2 and H3, and therefore it would be appreciated that it would not be right to keep power domain of router R3 or bridge B2 'ON' during communication between hosts H1 and H4. Similarly, it would not be right to keep power domains of R1, R2, R4, B1, and PR1 in ON state during communication between hosts H2 and H3. Therefore, these two sets of NoC elements can have different power domains such that NoC elements R1, R2, R4, B1, and PR1 can be assigned a power domain PD1, and NoC elements R3, B2 can be assigned a power domain PD2. In an example implementation, both the power domains PD1 and PD2 can be configured to form part of different power profiles (PPs) because if they form part of the same PP, both the sets would be ON when their power profile is active, which may be undesirable. As mentioned above, new power domains can always also be assigned to one or more of the NoC elements, however ensuring that the pre-defined or dynamically changing constraints are met.

In an aspect, system of the present disclosure can be configured to incorporate one or a combination of NoC specification/design, traffic characteristics, connectivity between hosts, power specification of hosts, and weights of existing power profiles, among other like parameters to assign one or more NoC elements with respective power domains and voltage domains. In an example implementation, system of the present disclosure can enable computation/identification of NoC elements such as routers, pipelines, bridges, among others that are required to be active in each power profile (PP). For instance, power profile PP1 can include one or more power domains say PD1, PD2, and PD3, and all such NoC elements that form part of communications between hosts that are on either of the power domains PD1, PD2, and PD3 can be identified. With respect to FIG. 4 for instance, in case host H1 is associated with PD1 and host H2 is associated with PD2, all the NoC elements R1, R2, B1, R3, and B2 can be extracted/identified as they fall in the route of communication between hosts that have power domains of a power profile PP1.

Once all NoC elements required to be active in a given power profile have been identified, based on pre-defined constraints on assignment of power domain and voltage domain, one or more possible assignment choices of PDs/VDs for each NoC element can be identified, from which such PDs/VDs that violate the power profile practice PP1 identified above can be eliminated. Therefore, no such PD/VD should be selected that is off when the applicable power profile PP1 is active. Such elimination of non-applicable/violating PDs/VDs for the given NoC element, can yield a final set of allowed choices of PDs/VDs for NoC elements. With respect to the above example, assuming PP1 (having power domains PD1, PD2, and PD3) is applicable to communication between host H1 and host H4, routers R1, R2, and R4 can have possible choices of PD1, PD2, and PD3 assuming they meet all the constraints. One should appreciate that even power assignment of power domains to one or more hosts can be based on traffic specification that defines the type/extent/manner/mode of communication that takes place between various hosts. For instance, in case hosts H1 and H3 never communicate with each, they can be configured with power domains that are part of different power profiles such that when power domain of H1 is ON, power domain of H3 can be switched OFF. However, at the same time, in case there are one or more NoC elements that need to be put ON when both H1 and H3 are on, the hosts can be configured/assigned power domains that are either the same or form part of a common power profile. This example can avoid multiple power profiles from being activated simultaneously.

In an example implementation, from amongst the final allowed PD/VD choices of assignment, a random PD/VD can be assigned to each NoC element and a cost function F can then be computed based on hardware cost/area and power cost. Hardware cost can be based on number of isolation cells (ICs) that are used during power domain crossing and number of level shifters (LCs) that are used during the voltage domain crossing. For instance, with respect to FIG. 4, in case R1, R2, and B1 all are assigned power domain PD1, there would be no power domain crossing in between these three and therefore there would no need of any isolation cells or even of level shifters. Power cost, on the other hand, can be based on number of NoC elements that are ON in each power profile. As each power profile has a weight associated thereto, based on traffic characteristics, number of power domains that form part of the PP, and number hosts/elements that the PP is applicable to; weighted power cost can also be compute using such weights. Therefore, overall cost of the interconnect architecture can be computed after each PD/VD assignment as follows:

$F=F_A*x+F_P*(1-x)$, where $F_A$ represents the hardware area cost, $F_P$ represents the power cost, and x represents the desired tradeoff between power consumption and hardware area given by a user, and wherein $F_A$ can be represented as:

$F_A=F_{IC}*IC+F_{LS}*LS$, wherein IC represents number of isolation cells, LS represents number of level shifters, $F_{IC}$ represents cost of each incorporating each isolation cell, and $F_{LS}$ represents cost of each incorporating each level shifter;

$F_P=SUM(P(PP_i)*w(PP_i))/SUM(w(PP_i))$, where $w(PP_i)$ represents weight of each power profile, and $PP_i$ represent power cost of each power profile.

According to one example implementation, once desired set of NoC elements have been assigned a power domain and a voltage domain, power profile that includes the assigned PD can be configured to include the NoC elements such that only the new NoC elements that have been assigned PD are included in/added to the appropriate PP. For instance, in case earlier, PD1 was assigned to H1 and H4, upon assignment of PD1 to R1 and R2, the PP having PD1 can be updated to include the additional NoC elements.

According to another example implementation, apart from traffic/communication flow specification, automatic PD/VD assignment of the present disclosure can also be configured to assign PD/VD's based on neighboring NoC elements. For instance, with respect to FIG. 4, in case R2 is assigned with PD4 of PP2, as B1 is a neighbor of R2 and is not connected with any other NoC element, B1 can automatically be assigned the same power domain of PD4 of PP2.

In another example implementation, automatic PD/VD assignment of the present disclosure can also be configured to dynamically change the assignment of PD/VD based on change in traffic specification, constraints, among other like factors as mentioned above. Therefore, manual intervention may not be required to assign PD/VD to one or more NoC elements. In an instance, in case H4 was earlier only configured to interact with H1 but with changed traffic specification now also communicates with H3, R4 can be re-assigned a PD/VD such that it can be part of a power profile that can support both the communication links.

In another example implementation, upon updation of power profile, simulated annealing can be performed on revised NoC element assignments of PD/VD, in order to recompute costs and change assignments based on the recomputed costs. In an example implementation of simulated annealing, a first initial temperature can be kept high and the temperature can then, at a defined rate, be brought down stepwise till a final temperature, post which the annealing process can be stopped. During the stepwise temperature reduction, a random NoC element that has been assigned a specific PD/VD can be picked, and for "n" iterations, PD and VD assignments for the selected/picked NoC element can be changed. In an example implementation, in case the selected NoC element has some other PD/VD choices, one of the choices can be picked to change the PD/VD assignment of the concerned NoC element, post which it can be checked if the new assignment meets the defined constraints and, if affirmative, costs can again be recomputed to arrive at a new cost. Such change can then, based on the new cost, old cost, and a probabilistic function, either be accepted or rejected. In an example implementation, the probabilistic function can further be based on any or a combination of previous cost, new cost, and temperature. For instance, a change in PD/VD assignment can be acceptable at a high temperature even if the cost increases, whereas, in another instance, a change in PD/VD assignment can be only acceptable at a low temperature if the cost decreases. Such change in PD/VD assignment from a possible set of choices for the selected NoC element can be iterated "n" times, before the temperature is stepwise reduced to the lower level, wherein "n" can be defined, in an example implementation, based on any or a combination of NoC design/specification, power profile, among other parameters/attributes.

In another aspect, although the present disclosure relates to automatic assignment of power domain and voltage domain to one or more NoC elements, the mechanism/techniques of the present disclosure can also be combined with manual assignment of the PD and VD. At the same time, system of the present disclosure can also learn from earlier and/or ongoing PD/VD assignments based on the assignment techniques that would be described hereinafter, and use such learning for selecting/assigning accurate/appropriate power domains and/or voltage domains to NoC elements. Other techniques such as simulated annealing, machine learning, intelligent heuristics, linear programming, cross entropy, optimization genetic algorithm can also be incorporated in the present disclosure for assignment of PD/VD to one or more NoC elements. In another aspect, upon assignment of power domain and/or voltage domain to each NoC element, .cpf and/or .upf type files can be generated and then communicated to the backend tools.

FIG. 5 illustrates an exemplary logical table 500 showing assignment of power domains to one or more NoC elements in accordance with an example implementation of the present disclosure. One should appreciate that such a table is completely exemplary in nature and may not necessarily be created or can easily have any other desired/configured format. Also, the assignment being shown is with respect to FIG. 4 of the present disclosure but is only completely exemplary in nature and actual assignment can also be based on many other parameters as highlighted in the instant disclosure.

As shown in FIG. 5, the table 500 has been created with respect to two power profiles, namely, PP1 and PP2, wherein PP1 has been shown to include three power domains, namely PD1, PD2, and PD3, and PP2 has also been shown to include three power domains, namely PD4, PD5, and PD3. It is to be noted that power profiles can overlap such that a given power domain can be present in two or more power profiles. As shown in table 500, power domain PD3 can be shared between both the power profiles PP1 and PP2, in which case the corresponding hosts/NoC elements of the power domain would be powered on in both the power profiles.

As shown, hosts H1, H2, H3, and H4 can be assigned based on traffic specification and other attributes, to PD1, PD4, PD5, and PD2 respectively. Based on the traffic specification, NoC design, constraints defined, weights associated with each power profile, among other attributes mentioned in the present disclosure, router R2 can be automatically assigned to PD1 as it may be desired to switch off R2 whenever H1 is not communicating. Similarly, bridge B1 can be assigned to PD1, and PR1 can be assigned to PD2. Similarly, B2 and R3 can be configured to form part of PP2, in any of the power domains PD4 and PD5 based on defined configurations/settings. Assuming, both hosts H2 and H1 use router R1 to communicate with B3 and H4 respectively, the router R1 can be assigned to a power domain PD3, which is shared between both the power profiles PP1 and PP2. One should appreciate that the mentioned power domain/power profile assignment table is completely exemplary in nature and any number of NoC elements can be configured in the present system and assigned their respective PD based on the above mentioned factors/parameters/attributes to optimize power consumption.

Figure 6:
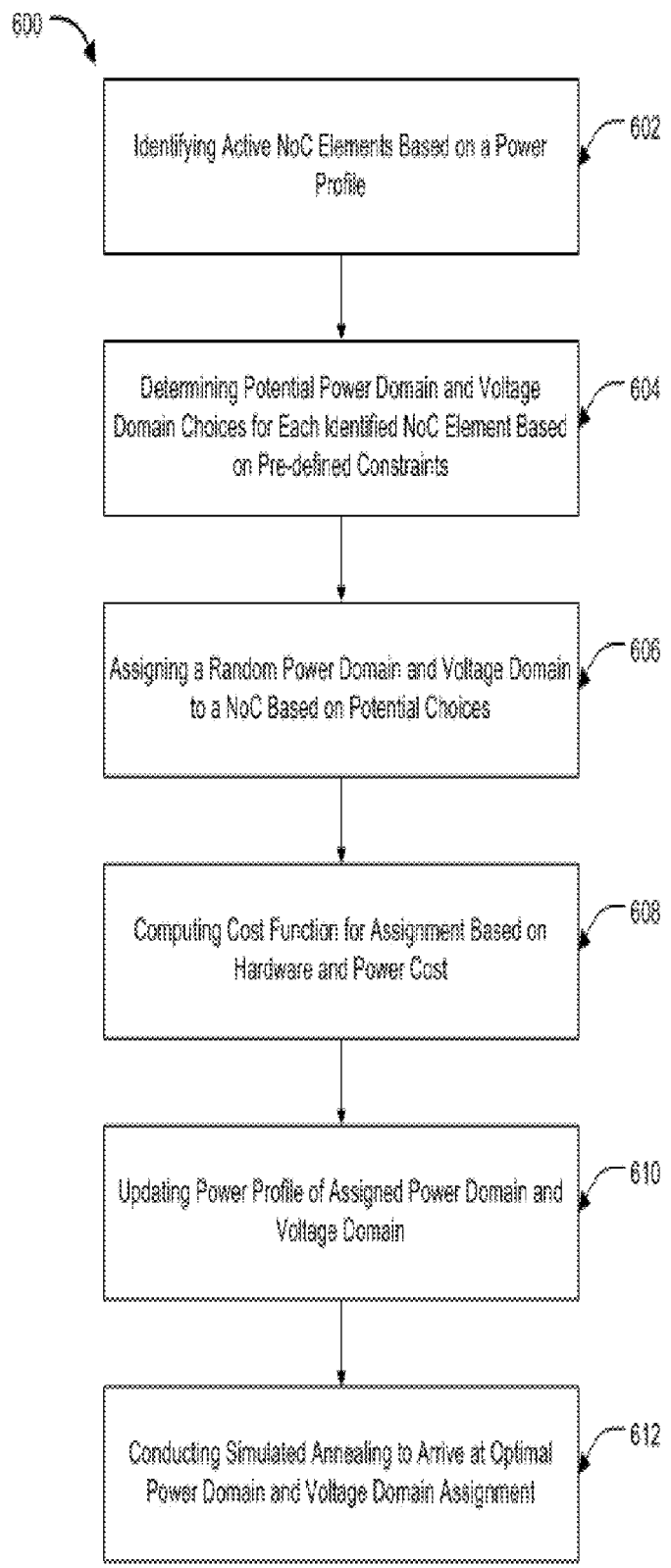
FIG. 6 illustrates an exemplary flow diagram for assignment of power domain and voltage domain to one or more NoC elements in accordance with an example implementation of the present disclosure.

FIG. 6 illustrates an exemplary flow diagram 600 for assignment of power domain and voltage domain to a NoC element in accordance with an example implementation of the present disclosure.

At step 602, NoC elements such as routers, pipelines, bridges, among others that are required to be active in each power profile (PP) can be computed. For instance, a power profile PP1 can include one or more power domains say PD1, PD2, and PD3, and all such NoC elements that form part of communications between hosts that are on either of the power domains PD1, PD2, and PD3 can be identified.

At step 604, once all NoC elements required to be active in a given power profile have been identified, based on pre-defined constraints on assignment of power domain and voltage domain, one or more possible assignment choices of PDs/VDs for each NoC element can be identified, from which such PDs/VDs that violate the power profile practice PP1 identified above can be eliminated. Therefore, no such PD/VD should be selected that is off when the applicable power profile PP1 is active. Such elimination of non-applicable/violating PDs/VDs for the given NoC element, can yield a final set of allowed choices of PDs/VDs for NoC elements.

At step 606, from amongst the final allowed PD/VD choices of assignment, a random PD/VD can be assigned to each NoC element and, at 608, a cost function F can then be computed based on hardware cost/area and power cost. Hardware cost can be based on number of isolation cells (ICs) that are used during power domain crossing and number of level shifters (LCs) that are used during the voltage domain crossing. Power cost, on the other hand, can be based on number of NoC elements that are ON in each power profile. As each power profile has a weight associated thereto based on traffic characteristics, number of power domains that form part of the PP, and number hosts/elements that the PP is applicable to, weighted power cost can also be compute using such weights. Therefore, overall cost of the interconnect architecture can be computed after each PD/VD assignment as follows:

$F=F_A*x+F_P*(1-x)$, where $F_A$ represents the hardware area cost, $F_P$ represents the power cost, and x represents the desired tradeoff between power consumption and hardware area given by a user, and wherein $F_A$ can be represented as:

$F_A=F_{IC}*IC+F_{LS}*LS$, wherein IC represents number of isolation cells, LS represents number of level shifters, $F_{IC}$ represents cost of each incorporating each isolation cell, and $F_{LS}$ represents cost of each incorporating each level shifter;

$F_P=SUM (P(PP_i)*w (PP_i))/SUM (w(PP_i))$, where $w(PP_i)$ represents weight of each power profile, and $PP_i$ represent power cost of each power profile.

At step 610, once desired set of NoC elements have been assigned a power domain and a voltage domain, power profile that includes the assigned PD can be configured to include the NoC elements such that only the new NoC elements that have been assigned PD are included in/added to the appropriate PP. For instance, in case earlier, PD1 was assigned to H1 and H4, upon assignment of PD1 to R1 and R2, the PP having PD1 can be updated to include the additional NoC elements.

At step 612, upon updating the power profile, simulated annealing can be performed on revised NoC element assignments of PD/VD in order to recompute costs and change assignments based on the recomputed costs. In an example implementation of simulated annealing, a first initial temperature can be kept high and the temperature can then, at a defined rate, be brought down stepwise till a final temperature, post which the annealing process can be stopped. During the stepwise temperature reduction, a random NoC element that has been assigned a specific PD/VD can be picked, and for "n" iterations, PD and VD assignments for the selected/picked NoC element can be changed. In an example implementation, in case the selected NoC element has some other PD/VD choices, one of the choices can be picked to change the PD/VD assignment of the concerned NoC element, post which it can be checked if the new assignment meets the defined constraints and, if affirmative, costs can again be recomputed to arrive at a new cost. Such change can then, based on the new cost, old cost, and a probabilistic function, either be accepted or rejected. In an example implementation, the probabilistic function can further be based on any or a combination of previous cost, new cost, and temperature. For instance, a change in PD/VD assignment can be acceptable at a high temperature even if the cost increases, whereas, in another instance, a change in PD/VD assignment can be only acceptable at a low temperature if the cost decreases. Such change in PD/VD assignment from a possible set of choices for the selected NoC element can be iterated "n" times, before the temperature is stepwise reduced to the lower level, wherein "n" can be defined, in an example implementation, based on any or a combination of NoC design/specification, power profile, among other parameters/attributes.

Figure 7:
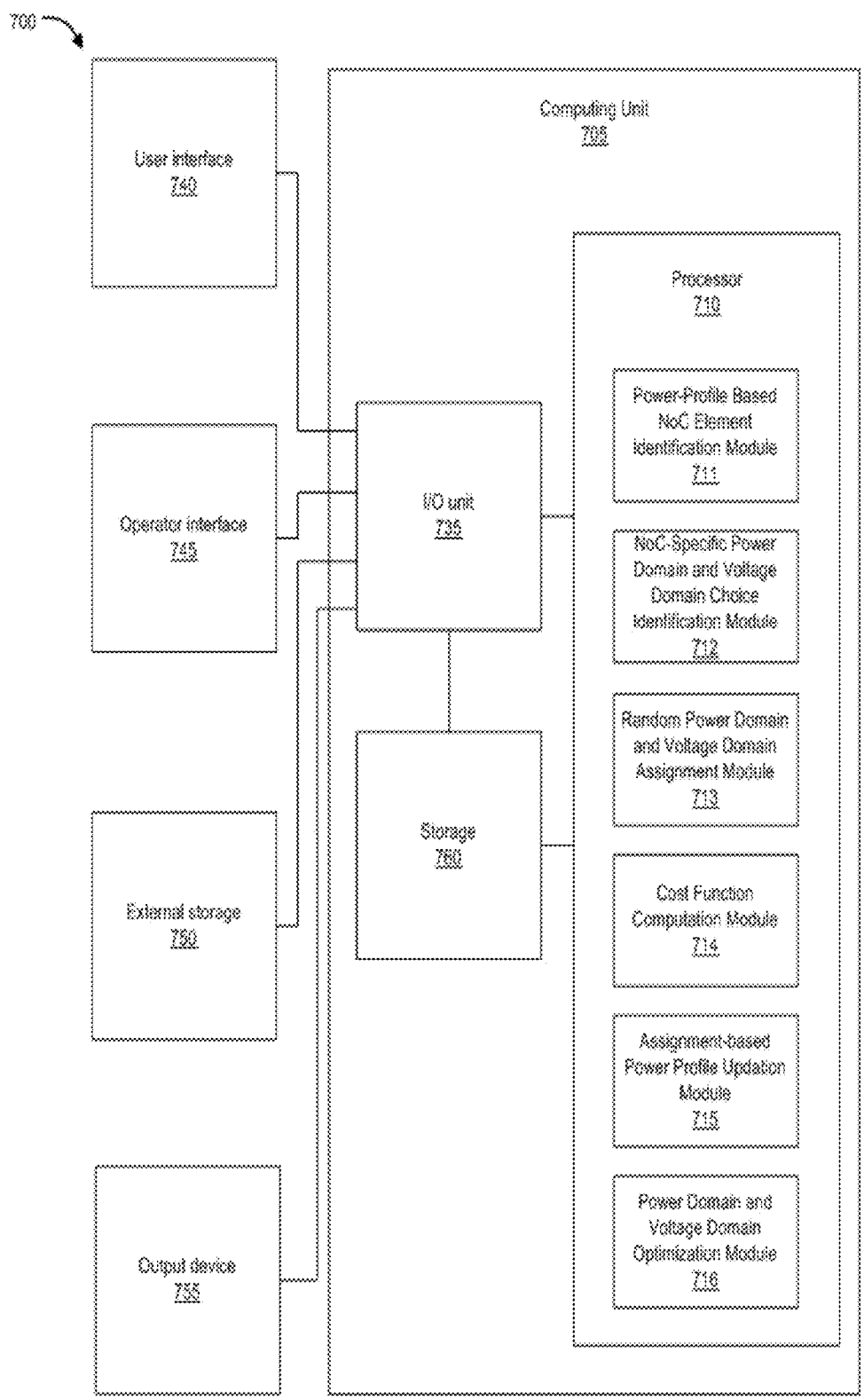
FIG. 7 illustrates an example of computer system on which example implementations can be implemented.

FIG. 7 illustrates an example computer system 700 on which example implementations may be implemented. The computer system 700 includes a server 705 which may involve an I/O unit 735, storage 760, and a processor 710 operable to execute one or more units as known to one of skill in the art. The term "computer-readable medium" as used herein refers to any medium that participates in providing instructions to processor 710 for execution, which may come in the form of computer-readable storage mediums, such as, but not limited to optical disks, magnetic disks, read-only memories, random access memories, solid state devices and drives, or any other types of tangible media suitable for storing electronic information, or computer-readable signal mediums, which can include carrier waves. The I/O unit processes input from user interfaces 740 and operator interfaces 745 which may utilize input devices such as a keyboard, mouse, touch device, or verbal command.

The server 705 may also be connected to an external storage 750, which can contain removable storage such as a portable hard drive, optical media (CD or DVD), disk media or any other medium from which a computer can read executable code. The server may also be connected an output device 755, such as a display to output data and other information to a user, as well as request additional information from a user. The connections from the server 705 to the user interface 740, the operator interface 745, the external storage 750, and the output device 755 may via wireless protocols, such as the 802.11 standards, Bluetooth® or cellular protocols, or via physical transmission media, such as cables or fiber optics. The output device 755 may therefore further act as an input device for interacting with a user.

The processor 710 may execute one or more modules including a power-profile based NoC element identification module 711, a NoC-specific power domain and voltage domain choice identification module 712, a random power domain and voltage domain assignment module 713, a cost function computation module 714, an assignment-based power profile updation module 715, and a power domain and voltage domain optimization module 716.

In an aspect, power-profile based NoC element identification module 711 can be configured to compute NoC elements such as routers, pipelines, bridges, among others that are required to be active in each power profile (PP). For instance, a power profile PP1 can include one or more power domains say PD1, PD2, and PD3, and all such NoC elements that form part of communications between hosts that are on either of the power domains PD1, PD2, and PD3 can be identified.

In an aspect, NoC-specific power domain and voltage domain choice identification module 712 can be configured to, once all NoC elements required to be active in a given power profile have been identified, based on pre-defined constraints on assignment of power domain and voltage domain, identify one or more possible assignment choices of PDs/VDs for each NoC element, from which such PDs/VDs that violate the power profile practice PP1 identified above can be eliminated. Therefore, no such PD/VD should be selected that is off when the applicable power profile PP1 is active. Such elimination of non-applicable/violating PDs/VDs for the given NoC element, can yield a final set of allowed choices of PDs/VDs for NoC elements.

In another aspect, random power domain and voltage domain assignment module 713 can be configured to, from amongst the final allowed PD/VD choices of assignment, assign a random PD/VD to each NoC element.

In another aspect, cost function computation module 714 can be configured to compute a cost function F based on hardware cost/area and power cost. Hardware cost can be based on number of isolation cells (ICs) that are used during power domain crossing and number of level shifters (LCs) that are used during the voltage domain crossing. Power cost, on the other hand, can be based on number of NoC elements that are ON in each power profile. As each power profile has a weight associated thereto based on traffic characteristics, number of power domains that form part of the PP, and number hosts/elements that the PP is applicable to, weighted power cost can also be compute using such weights. Therefore, overall cost of the interconnect architecture can be computed after each PD/VD assignment as follows:

$F = F_A * x + F_P * (1-x)$, where $F_A$ represents the hardware area cost, $F_P$ represents the power cost, and x represents the desired tradeoff between power consumption and hardware area given by a user, and wherein $F_A$ can be represented as:

$F_A = F_{IC} * IC + F_{LS} * LS$, wherein IC represents number of isolation cells, LS represents number of level shifters, $F_{IC}$ represents cost of each incorporating each isolation cell, and $F_{LS}$ represents cost of each incorporating each level shifter;

$F_P = SUM (P(PP_i) * w (PP_i))/SUM (w(PP_i))$, where $w(PP_i)$ represents weight of each power profile, and $PP_i$ represent power cost of each power profile.

In another aspect, assignment-based power profile updation module 715 can be configured to, once desired set of NoC elements have been assigned a power domain and a voltage domain, update the power profile that includes the assigned PD so as to include the NoC elements such that only the new NoC elements that have been assigned PD are included in/added to the appropriate PP.

In yet another aspect, power domain and voltage domain optimization module 716 can be configured to, upon updation of power profile, perform simulated annealing on revised NoC element assignments of PD/VD in order to recompute costs and change assignments based on the recomputed costs. In an example implementation of simulated annealing, a first initial temperature can be kept high and the temperature can then, at a defined rate, be brought down stepwise till a final temperature, post which the annealing process can be stopped. During the stepwise temperature reduction, a random NoC element that has been assigned a specific PD/VD can be picked, and for "n" iterations, PD and VD assignments for the selected/picked NoC element can be changed. In an example implementation, in case the selected NoC element has some other PD/VD choices, one of the choices can be picked to change the PD/VD assignment of the concerned NoC element, post which it can be checked if the new assignment meets the defined constraints and, if affirmative, costs can again be recomputed to arrive at a new cost. Such change can then, based on the new cost, old cost, and a probabilistic function, either be accepted or rejected. In an example implementation, the probabilistic function can further be based on any or a combination of previous cost, new cost, and temperature. For instance, a change in PD/VD assignment can be acceptable at a high temperature even if the cost increases, whereas, in another instance, a change in PD/VD assignment can be only acceptable at a low temperature if the cost decreases. Such change in PD/VD assignment from a possible set of choices for the selected NoC element can be iterated "n" times, before the temperature is stepwise reduced to the lower level, wherein "n" can be defined, in an example implementation, based on any or a combination of NoC design/specification, power profile, among other parameters/attributes.

Furthermore, some portions of the detailed description are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the example implementations, the steps carried out require physical manipulations of tangible quantities for achieving a tangible result.

Moreover, other implementations of the present application will be apparent to those skilled in the art from consideration of the specification and practice of the example implementations disclosed herein. Various aspects and/or components of the described example implementations may be used singly or in any combination. It is intended that the specification and examples be considered as examples, with a true scope and spirit of the application being indicated by the following claims.

What is claimed is:

1. A method for generating a Network on Chip (NoC) and a System on Chip (SoC), comprising:
   automatically assigning a power configuration to one or more SoC agents and one or more NoC elements based on at least one of a traffic specification of the SoC comprising a sequence of traffic flows for the SoC and a power specification of the one or more agents; and
   generating the NoC and the SoC from the traffic specification and the power specification;
   wherein the power specification comprises at least one of a power domain, an always on indicator, a voltage domain, and a voltage level for each of the one or more agents;
   wherein the power specification comprises one or more power profiles, each power profile indicative of a defined mode of operation of the SoC, wherein said power profile further comprises power state and voltage state of the one or more SoC agents and the one or more NoC elements;
wherein the automatically assigning the power configuration is based on one or more constraints.

2. The method of claim 1 wherein the one or more constraints comprises at least one of static power consumption and dynamic power consumption of the SoC and the NoC.

3. The method of claim 1 wherein the one or more constraints comprises hardware area utilized by the power configuration.

4. The method of claim 1, wherein one or more of the constraints comprises proximity restrictions on power domain and voltage domain of one of said one or more SoC agents.

5. The method of claim 1, wherein the one or more constraints comprises at least one of a threshold of allowed new power domains and a threshold for new voltage domains for the SoC and the NoC.

6. The method of claim 1, wherein the one or more constraints comprises an indication for allowing an always-on power domain.

7. The method of claim 1, wherein the assignment of the power configuration is conducted based on a reduction of at least one of a static power consumption and a dynamic power consumption of the SoC and the NoC.

8. The method of claim 1, wherein the assignment of the power configuration is conducted based on a minimization of a number of new power domains and/or new voltage domains used in the power configuration.

9. The method of claim 1, wherein the assignment of power configurations is conducted based on a minimization of a hardware area utilized for the power configuration.

10. The method of claim 1, wherein the automatically assigning the power configuration is based on a process comprising:
computing active ones of the one or more SoC agents and the one or more NoC elements for each mode of operation based on at least one of the traffic specification and the power specification;
computing, based on one or more constraints and the computed active ones of the one or more agents and the one or more NoC elements, at least one of available power domains, available voltage domains and available voltage levels for the one or more agents; and
selecting the power configuration for each of the one or more agents and the one or more NoC elements based on the at least one of the available power domains, the voltage domains, and the voltage levels.

11. The method of claim 10, wherein the selecting the power configuration for the each of the one or more agents is based on a cost function, wherein the cost function based on at least one of area utilized, static power consumption and dynamic power consumption.

12. The method of claim 10, wherein the process comprises accepting the selecting of the power configuration for the each of the one or more agents based on a probabilistic function.

13. The method of claim 12, wherein the process is iterated based on an algorithm, and wherein the available power domains, the voltage domains, and the available voltage levels are updated based on the accepting.

14. The method of claim 10, wherein the selection of power configuration is performed using one or more of machine learning, linear programming, simulated annealing, and genetic algorithms.

* * * * *